(12) United States Patent
Cheng et al.

(10) Patent No.: US 11,815,155 B2
(45) Date of Patent: Nov. 14, 2023

(54) ZERO-STIFFNESS IMPACT ISOLATION DEVICE

(71) Applicants: Beihang University, Beijing (CN); Hangzhou Deti Civil Air Defense Equipment Co., Ltd., Zhejiang (CN)

(72) Inventors: Wei Cheng, Beijing (CN); Ming Li, Beijing (CN); Junjie Mei, Beijing (CN); Ji Ran, Beijing (CN); Hexiang Zheng, Beijing (CN); Feijie Qian, Beijing (CN)

(73) Assignees: Beihang University, Beijing (CN); Hangzhou Deti Civil Air Defense Equipment Co., Ltd., Zhejiang (CN)

( * ) Notice: Subject to any disclaimer, the term of this patent is extended or adjusted under 35 U.S.C. 154(b) by 132 days.

(21) Appl. No.: 17/605,685

(22) PCT Filed: Aug. 5, 2020

(86) PCT No.: PCT/CN2020/107105
§ 371 (c)(1),
(2) Date: Oct. 22, 2021

(87) PCT Pub. No.: WO2021/023222
PCT Pub. Date: Feb. 11, 2021

(65) Prior Publication Data
US 2022/0163084 A1 May 26, 2022

(30) Foreign Application Priority Data

Aug. 5, 2019 (CN) .......................... 201910716329.0

(51) Int. Cl.
*F16F 7/00* (2006.01)
(52) U.S. Cl.
CPC ............ *F16F 7/00* (2013.01); *F16F 2228/06* (2013.01); *F16F 2232/08* (2013.01)

(58) Field of Classification Search
CPC ....... F16F 7/00; F16F 2228/06; F16F 2232/08
(Continued)

(56) References Cited

U.S. PATENT DOCUMENTS

| 3,895,788 A * | 7/1975 | Liesegang | F16L 3/2056 267/70 |
| 5,018,700 A * | 5/1991 | Hardtke | F16L 3/217 267/140.3 |
| 8,251,338 B2 * | 8/2012 | Hardtke | F16L 3/21 248/580 |

FOREIGN PATENT DOCUMENTS

| CN | 203641365 U | 6/2014 |
| CN | 105864339 A | 8/2016 |

(Continued)

OTHER PUBLICATIONS

International Search Report and Written Opinion dated Nov. 9, 2020 in related PCT/CN2020/107105.
(Continued)

*Primary Examiner* — Xuan Lan Nguyen
(74) *Attorney, Agent, or Firm* — Culhane Meadows PLLC; Robert C. Klinger

(57) ABSTRACT

A zero-stiffness impact isolation device includes a shell, a half-hourglass-shaped boss, a sliding block, a spring, a motion guide assembly, and an inner core. Where the motion guide assembly includes a linear bearing fixed to the shell and the inner core and a corresponding sliding rod, and is divided into a transverse guide assembly and a longitudinal guide assembly. The spring is sleeved outside the sliding rod of the transverse motion guide assembly, and two ends of the spring are in contact with the sliding block and the inner core, respectively. When the device suffers from external impact load, the inner core and the separated object carry out a reciprocating motion, the sliding block is extruded by the half-hourglass-shaped boss to move side to side with respect
(Continued)

to the inner core, and the spring provides elastic force to the sliding block in the process.

7 Claims, 1 Drawing Sheet

(58) Field of Classification Search
USPC .................. 188/284; 248/570; 267/182, 172
See application file for complete search history.

(56) References Cited

FOREIGN PATENT DOCUMENTS

| | | |
|---|---|---|
| CN | 106742091 A | 5/2017 |
| CN | 108458034 A | 8/2018 |
| CN | 208123323 U | 11/2018 |
| CN | 108953482 A | 12/2018 |
| CN | 109595283 A | 4/2019 |
| CN | 110410443 A | 11/2019 |
| RU | 2557865 C1 | 7/2015 |

OTHER PUBLICATIONS

Office Action issued by the Chinese Patent Office dated Apr. 2, 2020 in related Chinese Patent Application No. 201910716329.0.

\* cited by examiner

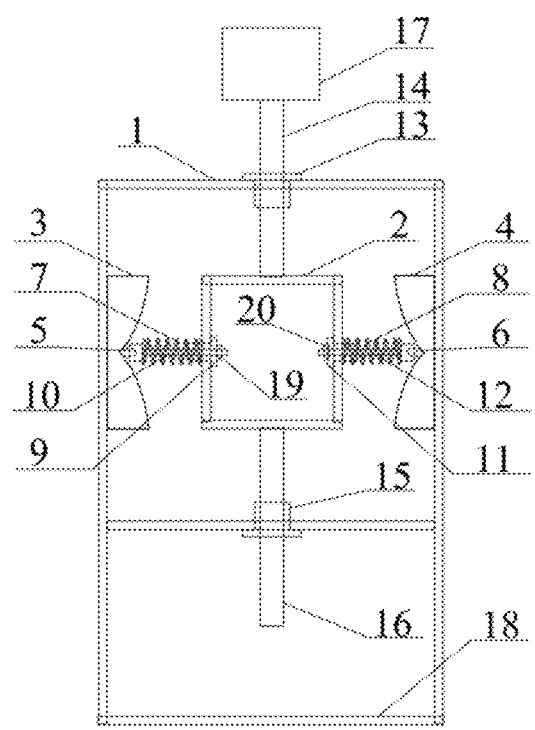

ZERO-STIFFNESS IMPACT ISOLATION DEVICE

PRIORITY INFORMATION

This patent application is a U.S. National Stage filing of International Application No. PCT/CN2020/107105 filed Aug. 5, 2020, which claims priority to the Chinese Patent Application No. 201910716329.0, filed with the China National Intellectual Property Administration (CNIPA) on Aug. 5, 2019, and entitled "ZERO-STIFFNESS IMPACT ISOLATION DEVICE", which is incorporated herein by reference in its entirety.

TECHNICAL FIELD

The present disclosure relates to the fields of impact resistance and shock absorption, and specifically relates to a zero-stiffness impact isolation device. External high-energy impact load can be controlled within an acceptable range, and the zero-stiffness impact isolation device is mainly applied to the fields of shock absorption and buffering.

BACKGROUND ART

A zero-stiffness impact isolation device is an approximately ideal shock absorption and buffering mechanism, which can ensure that high impact load of a separated object is controlled within an acceptable range in the motion process, so that the zero-stiffness impact isolation device is widely applied to many fields and occasions at present, such as the fields of aerospace, mechanical design and automation, robot and mechatronics. Existing zero-stiffness devices can be divided into active devices and passive devices, additional sensing and feedback control equipment needs to be added to the active device, complexity and cost of the device are increased, the passive device mostly adopts a positive and negative stiffness parallel connection mode to achieve zero stiffness, however, due to the improvement of the requirement for installation position accuracy during parallel connection, the engineering reliability of the device is reduced.

SUMMARY

For the defects in the prior art, the present disclosure aims to provide a zero-stiffness impact isolation device, a passive pure mechanical transmission method is adopted, zero stiffness is directly realized without using a parallel mechanism, mechanical friction factors are considered in a design method, and the reliability and engineering applicability of the device are improved. The device adopts a passive method with stronger engineering applicability to realize zero stiffness, and is easy to design, simple in structure, high in reliability and convenient to install and operate.

The technical purpose of the present disclosure is realized through the following technical scheme:

A zero-stiffness impact isolation device comprises a shell, an inner core, a first half-hourglass-shaped boss, a second half-hourglass-shaped boss, a first sliding block, a second sliding block, a first spring, a second spring, two transverse motion guide assemblies and two longitudinal motion guide assemblies, and the first half-hourglass-shaped boss and the second half-hourglass-shaped boss are fixedly connected to a left side wall and a right side wall of the shell respectively; the transverse motion guide assemblies comprise a first linear bearing, a first sliding rod matched with the first linear bearing, a second linear bearing and a second sliding rod matched with the second linear bearing; the first linear bearing and the second linear bearing are fixedly connected with a left side wall and a right side wall of the inner core respectively, a left end of the first sliding rod and a right end of the second sliding rod are fixedly connected with the first sliding block and the second sliding block respectively, and a right end of the first sliding rod and a left end of the second sliding rod are both provided with external threads with predetermined lengths; the first spring sleeves on an outside surface of the first sliding rod, two ends of the first spring are respectively in contact with the first sliding block and the left side wall of the inner core, the second spring sleeves on an outside surface of the second sliding rod, and two ends of the second spring are respectively in contact with the second sliding block and the right side wall of the inner core; the longitudinal motion guide assemblies comprise a third linear bearing, a third sliding rod matched with the third linear bearing, a fourth linear bearing and a fourth sliding rod matched with the fourth linear bearing; the third linear bearing and the fourth linear bearing are fixedly connected with an upper wall and an lower wall of the shell respectively, a lower end of the third sliding rod and an upper end of the fourth sliding rod are fixedly connected with an upper wall and a lower wall of the inner core respectively, an upper end of the third sliding rod is exposed out of the upper wall of the shell and fixedly connected with a separated object, and a lower end of the fourth sliding rod is a free end; and there are predetermined distances between the separated object and an upper surface of the upper wall of the shell as well as between the lower end of the fourth sliding rod and a mounting plane, and the predetermined distances are designed to ensure that a maximum stroke of the device is larger than a maximum movement amplitude of external impact load.

In some embodiments, by cooperation of a first nut and a second nut with external threads arranged at the right end of the first sliding rod and the left end of the second sliding rod respectively, pre-tightening lengths of the first spring and the second spring are adjusted, in an initial state, to ensure that the first sliding block and the second sliding block are in contact with central positions of outer surfaces of the first half-hourglass-shaped boss and the second half-hourglass-shaped boss respectively.

In some embodiments, the first sliding block and the second sliding block only move in a transverse direction under constraint of the transverse motion guide assemblies, and the inner core and the separated object only move in a longitudinal direction under constraint of the longitudinal motion guide assemblies; and during reciprocating motions of the inner core and the separated object, the first sliding block and the second sliding block are always in contact with the outer surfaces of the first half-hourglass-shaped boss and the second half-hourglass-shaped boss respectively.

In some embodiments, thickness gradients of the first half-hourglass-shaped boss and the second half-hourglass-shaped boss are designed to ensure that longitudinal components of acting forces between the first sliding block and the first half-hourglass-shaped boss and between the second sliding block and the second half-hourglass-shaped boss are guaranteed to be constant during reciprocating motions of the first sliding block and the second sliding block relative to the shell to achieve characteristic of zero-stiffness impact isolation of the device.

In some embodiments, the thickness gradients of the first half-hourglass-shaped boss and the second half-hourglassshaped boss are designed based on friction factors, and the first sliding block and the second sliding block each are in a roller mode or a sliding friction block mode.

In some embodiments, bearing capacity and stroke of the device are adjusted by simultaneously adjusting thicknesses and heights of the first half-hourglass-shaped boss and the second half-hourglass-shaped boss, so as to enable the device to meet impact isolation requirements of different working conditions in engineering application.

In some embodiments, the device is left-right symmetrical on the whole, is configured for horizontal impact isolation, and is configured for vertical impact isolation; when the device is configured for horizontal impact isolation, gravity influence is not considered, so that the first half-hourglass-shaped boss and the second half-hourglass-shaped boss are symmetrical longitudinally; when the device is configured for vertical impact isolation, a gravity direction is always downward, therefore, thickness gradients of lower half parts of the first half-hourglass-shaped boss and the second half-hourglass-shaped boss are designed in consideration of a total design bearing capacity of the device plus total gravity of the separated object, the third sliding rod, the fourth sliding rod, the inner core, the first linear bearing, the second linear bearing, the first sliding rod, the second sliding rod, the first spring, the second spring, the first sliding block and the second sliding block, and thickness gradients of upper half parts of the first half-hourglass-shaped boss and the second half-hourglass-shaped boss are designed in consideration of total design bearing capacity of the device minus the total gravity.

The principle of zero stiffness in the present disclosure is a half-hourglass-shaped boss thickness gradient identification method based on analyzing of the stress of the half-hourglass-shaped bosses. According to a specific implementation method, when the separated object moves up and down, the inner core is driven to move up and down together with the first linear bearing, the second linear bearing, the first sliding rod, the second sliding rod, the first spring, the second spring, the first sliding block and the second sliding block, the first spring and the second spring deform and press the first sliding block and the second sliding block respectively, and the first sliding block and the second sliding block further press the first half-hourglass-shaped boss and the second half-hourglass-shaped boss respectively. Through analyzing of the stress of the half-hourglass-shaped bosses, when transverse and longitudinal force balance conditions are met respectively, the thickness gradients of the first half-hourglass-shaped boss and the second half-hourglass-shaped boss can be identified under longitudinal zero-stiffness conditions, and the result indicates the characteristics of the thickness gradients of the first half-hourglass-shaped boss and the second half-hourglass-shaped boss, i. e, when the displacements are large, the transverse spring forces are large, and therefore, the thickness gradients are small, and when the displacements are small, the transverse spring forces are small, and therefore, the thickness gradients are large. The thickness of the first half-hourglass-shaped boss and the thickness of the second half-hourglass-shaped boss meeting the design requirement can be finally designed by the obtained thickness gradients.

Compared with the prior art, the device has the following advantages:

Firstly, considering that friction is inevitable in the practical application process, the influence of the friction effect is considered, so that the design index requirement can be accurately met without deliberately pursuing a micro-friction condition close to smoothness in the specific implementation process, the process and processing requirements are reduced, and the engineering applicability is high.

Secondly, the half-hourglass-shaped bosses adopted by the present disclosure ensure the characteristic of zero stiffness in the reciprocating process, and can be configured for effectively isolating upward or downward impact load.

Thirdly, the device is simple in structure, convenient to install and use, high in reliability, capable of being achieved by a traditional machining method and a common industrial product, good in manufacturability and low in cost.

BRIEF DESCRIPTION OF THE DRAWINGS

To describe the technical scheme in the embodiments of the present disclosure or in the prior art more clearly, the following briefly introduces the accompanying draws required for describing the embodiments. Apparently, the accompanying draws in the following description show merely some embodiments of the present disclosure, and those skilled in the art may still derive other accompanying draws from these accompanying draws without creative efforts.

FIGURE is a section view of a structure of a zero-stiffness impact isolation device in the present disclosure.

Reference numerals: 1 shell; 2 inner core; 3 first half-hourglass-shaped boss; 4 second half-hourglass-shaped boss; 5 first sliding block; 6 second sliding block; 7 first spring; 8 second spring; 9 first linear bearing; 10 first sliding rod; 11 second linear bearing; 12 second sliding rod; 13 third linear bearing; 14 third sliding rod; 15 fourth linear bearing; 16 fourth sliding rod; 17 separated object; 18 mounting plane; 19 first nut; and 20 second nut.

DETAILED DESCRIPTION OF THE EMBODIMENTS

The following clearly and completely describes the technical scheme in the embodiments of the present disclosure with reference to the accompanying draws in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide a zero-stiffness impact isolation device to solve the problems in the prior art.

To make the foregoing objective, features and advantages of the present disclosure clearer and more comprehensible, the present disclosure is further described in detail below with reference to the accompanying draws and specific embodiments.

As shown in FIGURE, a zero-stiffness impact isolation device comprises a shell 1, an inner core 2, a first half-hourglass-shaped boss 3, a second half-hourglass-shaped boss 4, a first sliding block 5, a second sliding block 6, a first spring 7, a second spring 8, two transverse motion guide assemblies and two longitudinal motion guide assemblies. The transverse motion guide assemblies comprise a first linear bearing 9, a first sliding rod 10 matched with the first linear bearing 9, a second linear bearing 11 and a second sliding rod 12 matched with the second linear bearing 11. The longitudinal motion guide assemblies comprise a third linear bearing 13, a third sliding rod 14 matched with the third linear bearing 13, a fourth linear bearing 15 and a fourth sliding rod 16 matched with the fourth linear bearing 15.

During specific installation, in the first step, the motion guide assemblies are installed; in the second step, the initial positions are adjusted, and core stress component is installed.

In the first step, the first linear bearing 9, the second linear bearing 11, the third linear bearing 13 and the fourth linear bearing 15 are fixedly connected with a left side wall and a right side wall of the core 2 and an upper wall and a lower wall of the shell 1 respectively. Then the first sliding rod 10, the second sliding rod 12, the third sliding rod 14 and the fourth sliding rod 16 are embedded into the corresponding linear bearings respectively; wherein a right end of the first sliding rod 10 and a left end of the second sliding rod 12 are separately provided with external threads with preset lengths.

In the second step, the first spring 7 sleeves on the outside of the first sliding rod 10, and the second spring 8 sleeves on the outside of the second sliding rod 12. A left end of the first sliding rod 10 and a right end of the second sliding rod 12 are fixedly connected with the first sliding block 5 and the second sliding block 6 respectively. Two ends of the first spring 7 are separately in contact with the first sliding block 5 and the left side wall of the inner core 2, and two ends of the second spring 8 are separately in contact with the second sliding block 6 and the right side wall of the inner core 2. A first nut 19 and a second nut 20 are matched with external threads at the right end of the first sliding rod 10 and the left end of the second sliding rod 12 respectively to adjust the pre-tightening amounts of the first spring 7 and the second spring 8, so that the distance between a left end of the first sliding block 5 and a right end of the second sliding block 6 is equal to the distance between a central position of a right outer surface of the first half-hourglass-shaped boss 3 fixedly connected to the left side wall of the shell 1 and a central position of a left outer surface of the second half-hourglass-shaped boss 4 fixedly connected to the right side wall of the shell 1. In the initial state, the left end of the first sliding block 5 and the right end of the second sliding block 6 are in contact with the central position of the right outer surface of the first half-hourglass-shaped boss 3 and the central position of the left outer surface of the second half-hourglass-shaped boss 4 respectively; and finally, upper and lower end surfaces of the core 2 are fixedly connected with a lower end of the third sliding rod 14 and an upper end of the fourth sliding rod 16 respectively.

The distance, exposed out of the upper wall of the shell 1, of an upper end of the third sliding rod 14 and the distance between a lower end of the fourth sliding rod 16 and a mounting plane 18 need to be reserved with preset sizes, and the preset sizes are large enough to guarantee that the preset sizes are larger than the maximum movement amplitude of external impact load.

The thickness design of the half-hourglass-shaped bosses is achieved based on stress analysis and force balance conditions. In order to meet the zero stiffness characteristic when the separated object moves up and down, the thickness gradients of the half-hourglass-shaped bosses need to meet the characteristics that the thickness gradients are small when the displacements are large and the thickness gradients are large when the displacements are small. When the isolation device is applied to solve the problem of transverse impact isolation, the thicknesses of the half-hourglass-shaped bosses are consistent up and down; and when the isolation device is applied to solve the problem of the longitudinal impact, the thicknesses of the lower half parts of the half-hourglass-shaped bosses are larger than that of the upper half part due to the action of gravity, but the thickness gradients still have the characteristics.

In order to avoid understanding ambiguity, it should be noted that the definitions of the heights and thicknesses of the half-hourglass bosses are described in the present disclosure. Referring to FIGURE, the zero-stiffness impact isolation device is longitudinally placed, and the heights of the half-hourglass-shaped bosses are the sizes of the half-hourglass-shaped bosses in the longitudinal direction; and the thicknesses of the half-hourglass-shaped bosses refer to the direction perpendicular to the height direction, namely the sizes of the half-hourglass-shaped bosses in the horizontal direction.

The specific test and application are divided into static performance test and dynamic application.

Firstly, the static performance test is carried out. The mounting plane 18 is fixed, a quasi-static tension and compression load is applied to the upper end of the third sliding rod 14, a force-displacement response curve of the device is obtained by a related static sensor equipment so as to determine the zero stiffness characteristic of the device.

Secondly, the dynamic application is carried out. The separated object 17 is fixedly connected with the upper end of the third sliding rod 14, and the mounting plane 18 is fixed on equipment in practical application. External impact load is applied to the mounting plane 18, the dynamic response characteristic of the separated object 17 is determined by related dynamic sensor equipment, so as to verify the zero-stiffness impact isolation performance of the device.

Some of the present disclosure, which is not described in detail, is well known to those skilled in the art.

Several examples are used for illustration of the principles and implementation methods of the present disclosure. The description of the embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A zero-stiffness impact isolation device, comprising a cabinet body, wherein the device comprises a shell, an inner core, a first half-hourglass-shaped boss, a second half-hourglass-shaped boss, a first sliding block, a second sliding block, a first spring, a second spring, two transverse motion guide assemblies and two longitudinal motion guide assemblies, and the first half-hourglass-shaped boss and the second half-hourglass-shaped boss are fixedly connected to a left side wall and a right side wall of the shell respectively;

the transverse motion guide assemblies comprise a first linear bearing, a first sliding rod matched with the first linear bearing, a second linear bearing and a second sliding rod matched with the second linear bearing; the first linear bearing and the second linear bearing are fixedly connected with a left side wall and a right side wall of the inner core respectively, a left end of the first sliding rod and a right end of the second sliding rod are fixedly connected with the first sliding block and the second sliding block respectively, and a right end of the first sliding rod and a left end of the second sliding rod are both provided with external threads with predetermined lengths; the first spring sleeves on an outside surface of the first sliding rod, two ends of the first spring are respectively in contact with the first sliding block and the left side wall of the inner core, the second spring sleeves on an outside surface of the second sliding rod, and two ends of the second spring are respectively in contact with the second sliding block and the right side wall of the inner core;

the longitudinal motion guide assemblies comprise a third linear bearing, a third sliding rod matched with the third linear bearing, a fourth linear bearing and a fourth sliding rod matched with the fourth linear bearing; the third linear bearing and the fourth linear bearing are fixedly connected with an upper wall and an lower wall of the shell respectively, a lower end of the third sliding rod and an upper end of the fourth sliding rod are fixedly connected with an upper wall and a lower wall of the inner core respectively, an upper end of the third sliding rod is exposed out of the upper wall of the shell and fixedly connected with a separated object, and a lower end of the fourth sliding rod is a free end; and there are predetermined distances between the separated object and an upper surface of the upper wall of the shell as well as between the lower end of the fourth sliding rod and a mounting plane, and the predetermined distances are designed to ensure that a maximum stroke of the device is larger than a maximum movement amplitude of external impact load.

2. The zero-stiffness impact isolation device according to claim 1, wherein by cooperation of a first nut and a second nut with external threads arranged at the right end of the first sliding rod and the left end of the second sliding rod respectively, pre-tightening lengths of the first spring and the second spring are adjusted, in an initial state, to ensure that the first sliding block and the second sliding block are in contact with central positions of outer surfaces of the first half-hourglass-shaped boss and the second half-hourglass-shaped boss respectively.

3. The zero-stiffness impact isolation device according to claim 1, wherein the first sliding block and the second sliding block only move in a transverse direction under constraint of the transverse motion guide assemblies, and the inner core and the separated object only move in a longitudinal direction under constraint of the longitudinal motion guide assemblies; and during reciprocating motions of the inner core and the separated object, the first sliding block and the second sliding block are always in contact with the outer surfaces of the first half-hourglass-shaped boss and the second half-hourglass-shaped boss respectively.

4. The zero-stiffness impact isolation device according to claim 1, wherein thickness gradients of the first half-hourglass-shaped boss and the second half-hourglass-shaped boss are designed to ensure that longitudinal components of acting forces between the first sliding block and the first half-hourglass-shaped boss and between the second sliding block and the second half-hourglass-shaped boss are guaranteed to be constant during reciprocating motions of the first sliding block and the second sliding block relative to the shell to achieve characteristic of zero-stiffness impact isolation of the device.

5. The zero-stiffness impact isolation device according to claim 4, wherein the thickness gradients of the first half-hourglass-shaped boss and the second half-hourglass-shaped boss are designed based on friction factors, and the first sliding block and the second sliding block each are in a roller mode or a sliding friction block mode.

6. The zero-stiffness impact isolation device according to claim 1, wherein bearing capacity and stroke of the device are adjusted by simultaneously adjusting thicknesses and heights of the first half-hourglass-shaped boss and the second half-hourglass-shaped boss, so as to enable the device to meet impact isolation requirements of different working conditions in engineering application.

7. The zero-stiffness impact isolation device according to claim 1, wherein the device is left-right symmetrical on the whole, is configured for horizontal impact isolation, and is configured for vertical impact isolation; when the device is configured for horizontal impact isolation, gravity influence is not considered, so that the first half-hourglass-shaped boss and the second half-hourglass-shaped boss are symmetrical longitudinally; when the device is configured for vertical impact isolation, a gravity direction is always downward, therefore, thickness gradients of lower half parts of the first half-hourglass-shaped boss and the second half-hourglass-shaped boss are designed in consideration of a total design bearing capacity of the device plus total gravity of the separated object, the third sliding rod, the fourth sliding rod, the inner core, the first linear bearing, the second linear bearing, the first sliding rod, the second sliding rod, the first spring, the second spring, the first sliding block and the second sliding block, and thickness gradients of upper half parts of the first half-hourglass-shaped boss and the second half-hourglass-shaped boss are designed in consideration of total design bearing capacity of the device minus the total gravity.

* * * * *